United States Patent
Marquette et al.

(10) Patent No.: US 6,499,053 B1
(45) Date of Patent: Dec. 24, 2002

(54) MASTER/SLAVE ARCHITECTURE FOR A DISTRIBUTED CHAT APPLICATION IN A BANDWIDTH CONSTRAINED NETWORK

(75) Inventors: Brian N. Marquette, League City, TX (US); Mark B. Stevens, Houston, TX (US); Michael Lindsey Williams, Seabrook, TX (US); John D. Wilson, Houston, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/345,183

(22) Filed: Jun. 30, 1999

(51) Int. Cl.$^7$ ............................................. G06F 13/00
(52) U.S. Cl. ...................................... 709/204; 709/206
(58) Field of Search ................................ 709/204, 208, 709/209, 211, 218; 705/26; 704/3

(56) References Cited

U.S. PATENT DOCUMENTS

| | | | |
|---|---|---|---|
| 5,313,524 A | * 5/1994 | Van Hulle et al. | 381/105 |
| 5,764,916 A | 6/1998 | Busey et al. | 395/200.57 |
| 5,774,668 A | 6/1998 | Choquier et al. | 395/200.53 |
| 5,793,365 A | 8/1998 | Tang et al. | 345/329 |
| 5,796,393 A | 8/1998 | MacNaughton ET AL. | 345/329 |
| 5,796,395 A | 8/1998 | De Hond | 345/331 |
| 5,828,839 A | 10/1998 | Moncreiff | 395/200.34 |
| 5,828,843 A | 10/1998 | Grimm et al. | 398/200.58 |
| 5,867,653 A | 2/1999 | Aras et al. | 395/200.34 |
| 6,018,768 A | * 1/2000 | Ullman et al. | 709/218 |
| 6,070,149 A | * 5/2000 | Tavor et al. | 705/26 |
| 6,195,687 B1 | * 2/2001 | Greaves et al. | 709/208 |
| 6,076,100 A1 | * 4/2001 | Cotriller et al. | 345/331 |
| 6,212,548 B1 | * 4/2001 | DeSimone et al. | 709/204 |
| 6,215,877 B1 | * 4/2001 | Matsumoto | 319/202 |
| 6,219,045 B1 | * 4/2001 | Leahy et al. | 380/277 |
| 6,292,769 B1 | * 9/2001 | Flanagan et al. | 704/3 |

FOREIGN PATENT DOCUMENTS

| | | |
|---|---|---|
| JP | 10-334051 | 12/1998 |

OTHER PUBLICATIONS

Internet Relay Chat Protocol, May 1993, J. Oikarinen, D. Reed.

* cited by examiner

*Primary Examiner*—David Wiley
(74) *Attorney, Agent, or Firm*—Karl O. Hesse

(57) ABSTRACT

A chat system includes a chat server and a plurality of chat clients in a network that may be bandwidth constrained. Each chat client is configurable, in response to instructions from the chat server, to operate in either a master mode or a slave mode. In the master mode, a chat client is capable of initiating a chat session. In the slave mode, a chat client is incapable of initiating a chat session and may participate only in a chat session initiated by another chat client operating in the master mode. An invitor user initiates, or adds a member to, a chat session by sending an invitation to an invitee user name at a proxy address at the chat server. If the chat server determines that the invitee is logged on, the chat server forwards the invitation to the invitee at the invitee's network address. If the invitee user accepts the invitation, the invitee client sends a join message to the invitor client, and the invitor client adds the invitee's user name and client network address to a chat member list. Then, the chat session proceeds with the chat member client sending chat input to the master client and the master client sending chat session updates to the member client.

23 Claims, 5 Drawing Sheets

US 6,499,053 B1

MASTER/SLAVE ARCHITECTURE FOR A DISTRIBUTED CHAT APPLICATION IN A BANDWIDTH CONSTRAINED NETWORK

FIELD OF THE INVENTION

The present invention relates generally to the field of network communications, and more particularly to a method of and system for managing chat sessions in a network that may be bandwidth constrained.

DESCRIPTION OF THE PRIOR ART

Internet chat applications are commonplace today. Chat sessions are used for the exchange of information between members in social or educational contexts, or in work environments. Members of teams or workgroups can exchange information within their team or workgroup through the use of a chat application.

In high bandwidth networks, users can freely join and participate in chat sessions. Users can initiate a chat session with any other user or group of users. There can be almost as many chat sessions active on a network at any particular time as there are users. In bandwidth constrained networks, such as wireless networks, distributed chat application can easily overwhelm the network.

Typically, users of a bandwidth constrained network have responsibility for implementing necessary controls on their own. When voice users share a common channel they can hear other users and they recognize the bandwidth limitations. For example, pilots and controllers at a busy airport generally police their own use of the network by appropriate vocal protocols regarding who may initiate and respond to selected communications over the network. However, in digital communications, such as chat, the bandwidth limitation is not apparent to the user.

One impediment to the use of self policing in a distributed chat environment is that all users must be schooled in and disciplined in the use of alternative network user protocols to effectively manage the network. In certain situations, such as military and police operations, personal communication devices are provided to members as tools but there are insufficient time and resources to implement and train members in effective chat management protocols.

Another problem associated with distributed chat applications in wireless or other bandwidth constrained networks is that the users do not always use the same personal communication device. For example, the personal communication device may be installed in a police vehicle that may be assigned to different officers over the course of the day or week. Thus, the network address or mobile identification number associated with the personal communications device is not always associated with the same user.

In chat applications, a user wishes to communicate with another user without regard to the network address of the other user. Most chat applications maintain a list of network addresses associated with users. To accommodate users using different devices, the list of users and network addresses could be updated dynamically; however, the list would become large for mobile applications. Additionally, updating the lists dynamically in real time would require a substantial amount of bandwidth. The amount of data set over the unreliable low bandwidth network links must be minimized.

It is an object of the present invention to provide a method of and system for managing distributed chat applications in a bandwidth constrained network.

SUMMARY OF THE INVENTION

The present invention provides a chat system that includes a chat server and a plurality of chat clients in a network that may be bandwidth constrained. Each chat client is configurable, in response to instructions from the chat server, to operate in either a master mode or a slave mode. In the master mode, a chat client is capable of initiating a chat session. In the slave mode, a chat client is incapable of initiating a chat session and may participate only in a chat session initiated by another chat client operating in the master mode.

The chat server maintains, or has access to, a list of names of users that are designated master users. A user logs onto the system from a host by sending a logon message over the network to the chat server. The host has installed thereon a chat client application that may be configured in either the master mode or the slave mode. The chat server determines if the user is a master user. If so, the chat server sends a "run as master" reply to the host machine and logs the user onto the system, by entering the user name and network address of the host in a list of logged on users. If the user is not a master user, then the chat server sends a "run as slave" reply to the host machine and logs the user onto the system, again by entering the user name and network address of the host in a list of logged on users.

An invitor user initiates, or adds a member to, a chat session according to the present invention by selecting a user name form a list of potential invitees or by entering a user name. The invitor client sends an invitation to the invitee's user name at a proxy address at the chat server. Preferably, the invitor client enters the invitee's user name in an invitee list. The chat server determines if the invitee user is logged on. If not, the chat server informs the invitor, and the invitor client removes the invitee from the invitee list. If the chat server determines that the invitee is logged on, the chat server forwards the invitation to the invitee at the invitee's network address. The invitee client prompts the invitee user to accept or decline the invitation. If the invitee user declines the invitation, the invitee client sends a decline message to the invitor client at the network address of the invitor client. If the invitee user accepts the invitation, the invitee client sends a join message to the invitor client, and the invitor client adds the invitee's user name and client network address to a chat member list. Then, the chat session proceeds with the chat member client sending chat input to the master client and the master client sending chat session updates to the member clients.

DESCRIPTION OF THE PREFERRED EMBODIMENT

Figure 1:
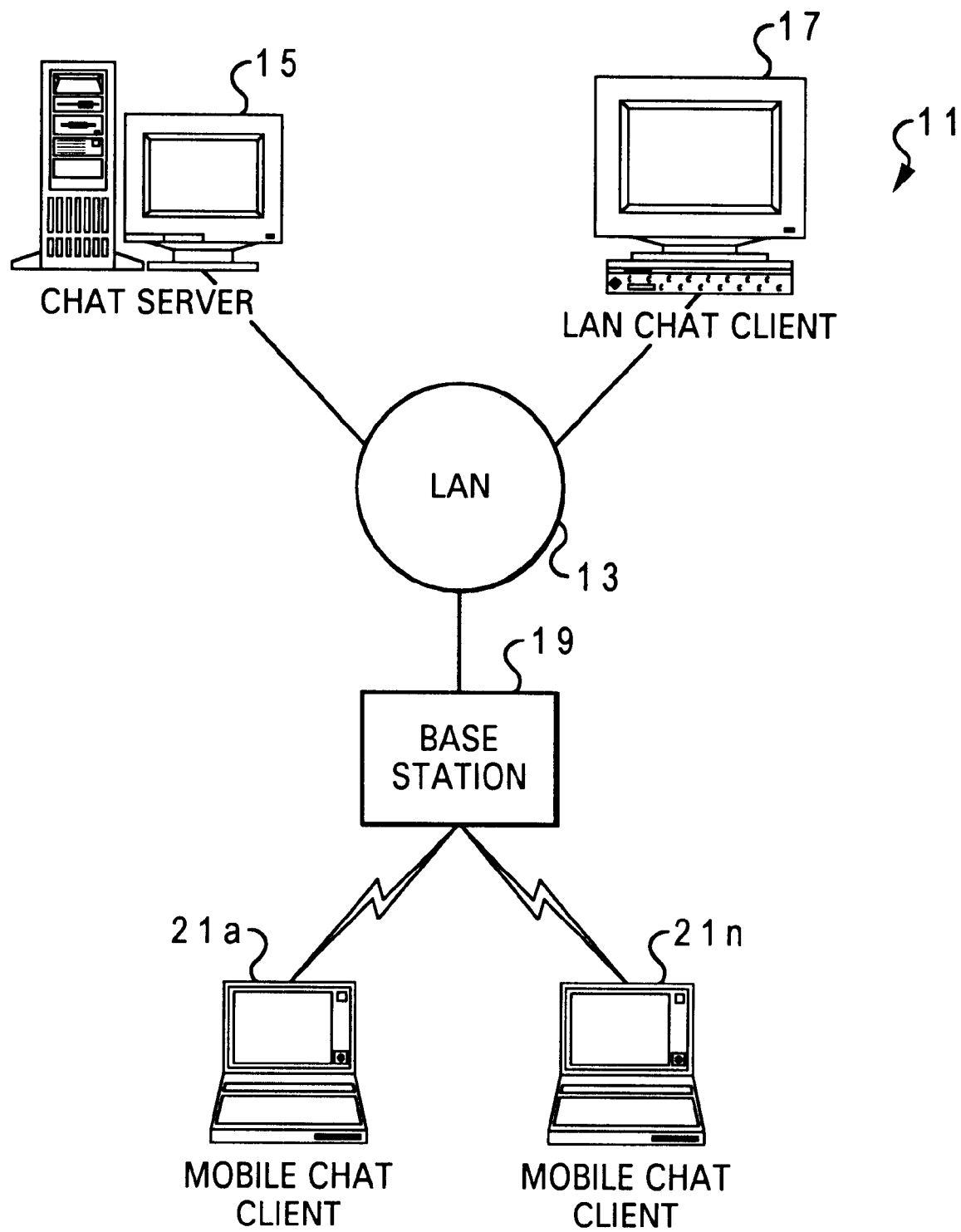
FIG. 1 is a block diagram of a system according to the present invention.

Referring now to the drawings, and first to FIG. 1, the system according to the present invention is designated generally by the numeral 11. System 11 includes a high bandwidth network backbone indicated generally by local area network (LAN) 13. As is well known to those skilled in the art, a high bandwidth network may be implemented in various topologies with various communications protocols. The high bandwidth network backbone can be, in addition to a local area network, a wide area network (WAN), an intranet, or even the Internet.

According to the present invention, system 11 includes a chat server 15 connected to LAN 13. In the preferred embodiment, chat server 15 is implemented in a personal computer or workstation. As will be explained in detail hereinafter, chat server 15 is responsible for managing chat sessions in system 11. System 11 may include one or more LAN chat clients 17. LAN chat clients 17 are physically connected to the high bandwidth backbone provided by LAN 13. LAN chat clients 17 are typically implemented in personal computers located at fixed network addresses within an organization.

System 11 includes an interface to a low bandwidth network. In the embodiment of FIG. 1, the interface is provided by one or more base stations 19 physically connected to the high bandwidth backbone provided by LAN 13. As is well known to those skilled of the art, base station 19 includes radio frequency (RF) transceivers that are adapted to communicate with mobile units. In the embodiment FIG. 1, the mobile units include a plurality of mobile chat clients 21. Mobile chat clients 21 may be implemented in portable or notebook PCs with RF transceiver interfaces. Additionally, mobile chat clients may be implemented in units installed within police cars, or personal communication devices.

Mobile chat clients 21 are configurable according to the present invention to operate in either a master mode or a slave mode. In the master mode, a mobile chat client 21 is fully functional in that it can initiate, participate in, and manage chat sessions. In the slave mode, a chat session initiation and management functionality is disabled in mobile chat client 21. Thus, in the slave mode, a mobile chat client 21 can participate only in chat sessions initiated by a mobile chat client 21 operating in the master mode.

Figure 2:
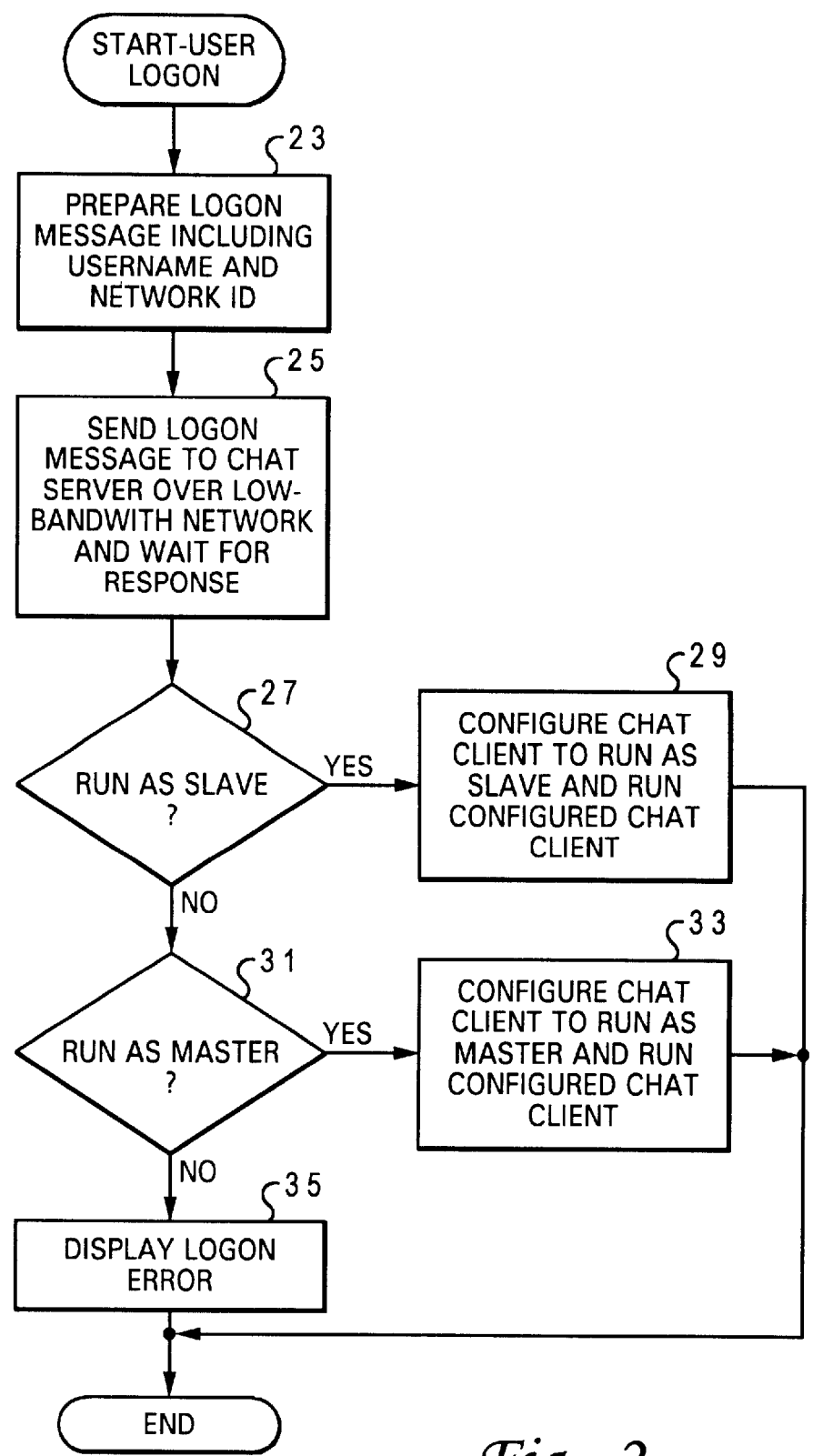
FIG. 2 is a flowchart of user logon to a chat client processing according to the present invention.

A mobile chat client 21 is configured to operate in either the master mode or the slave mode based upon configuration instructions received from chat server 15. Referring now to FIG. 2, there is shown a flowchart of user logon processing performed at a mobile chat client according to present invention. A suitable user interface on the mobile chat client presents the user with a logon screen, which prompts the user to enter a user name, and preferably a password. When the user enters the user name and password, the mobile chat client prepares a logon message including the user name and the network ID of the host upon which mobile chat is installed, as indicated at block 23. Then, the mobile chat client sends the logon message to the chat server over the low bandwidth network and waits for a response, at block 25. As will be explained with respect to FIG. 5, the response will be either "run as slave", "run as master", or a logon error message. If, at decision block 27, response is run as slave, the mobile chat client configures itself to run as a slave, as indicated at block 29. If, at decision block 31, the response is run as master, the mobile chat client configures itself to run as a master, as indicated at block 33. If the response is not run as master, the chat client displays a logon error message, at block 35, and user logon processing ends.

In the present invention, a chat session is initiated, or a member is added to an existing chat session, by an invitation from a chat client configured to run in the master mode.

Figure 3:
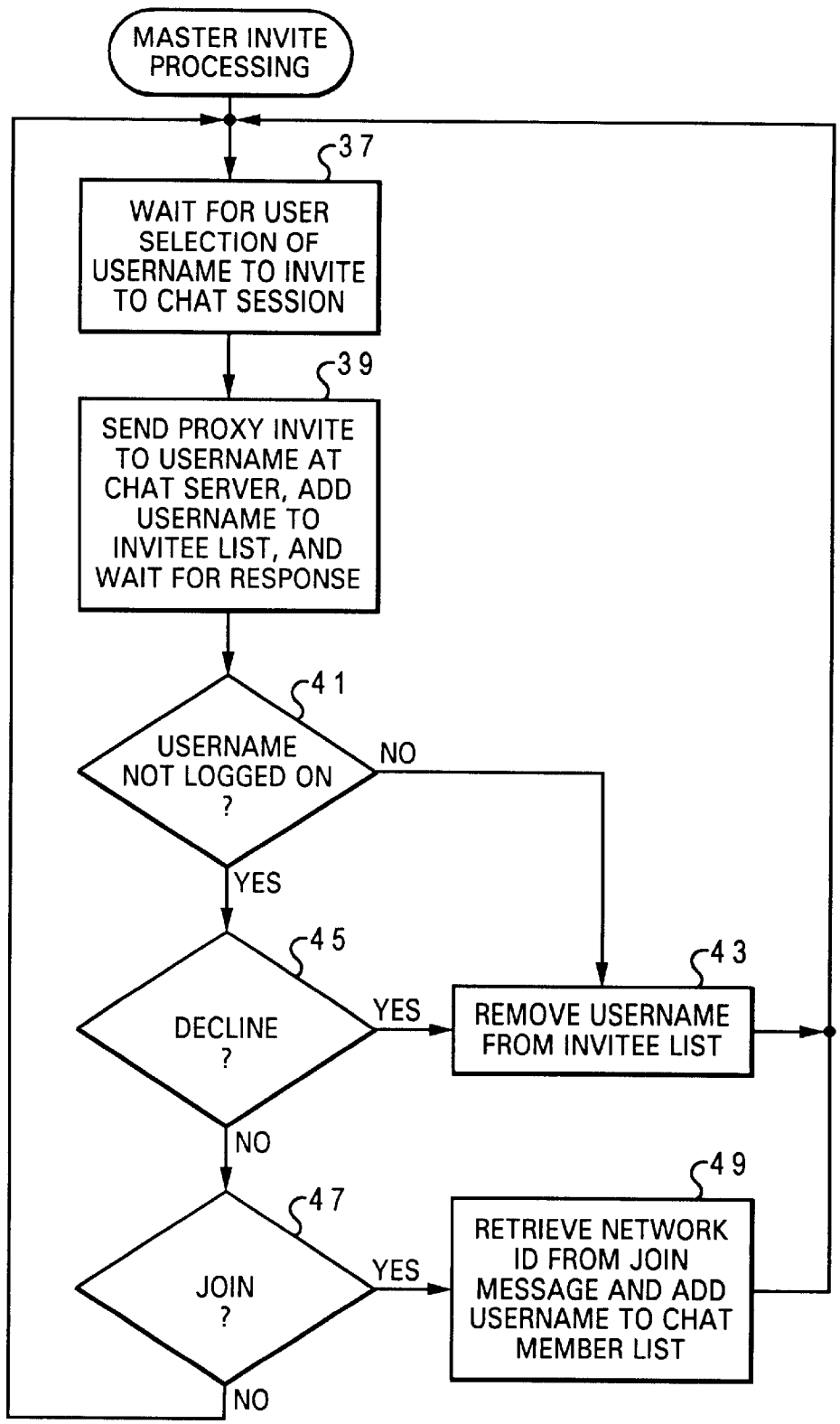
FIG. 3 is a flowchart of master client invite processing according to the present invention.

Referring now to FIG. 3, there is shown a flowchart of master client invite processing according to the present invention. The master client present the user with an invitation user interface. The master client waits for user selection of a user name to invite to the chat session, at block 37. Preferably, selection is performed by presenting to the user of the master client a list of user names or nicknames of persons within the organization. Alternatively, selection may be performed by prompting the master user to enter a user name.

According to the present invention, a chat client does not maintain a list of all associations of user names to network addresses. Rather, as will be explained in detail with respect to FIG. 5, the chat server builds a dynamic list of associations of user names to network addresses as users logon. According to the present invention, the master chat client sends a proxy invitation to the invitee user name at the chat server, adds the invitee user name to an invitee list, and waits for a response, at block 39.

As will be explained with respect to FIGS. 4 and 5, the response may be either that the invitee user name is not logon, that the invitee user name has declined the invitation, or that the invitee user name has elected to join the chat session. If, at decision block 41, the response is that the invitee user name is not logon, the master chat client removes the user name from the invitee list, at block 43, and invite processing returns to block 37. If, at decision block 45, response is that the invitee user name has declined the invitation, the master chat client again removes the user name from the invitee list at block 43. If, at decision block 47, the response is that the invitee user name has elected to join the chat session, the master chat client retrieves the network ID for the invitee user name from the join message and adds the invitee user name to a chat member list, at block 49. After a chat session is initiated, the master chat client receives chat input from the members of chat session and sends chat session updates to the members.

Figure 4:
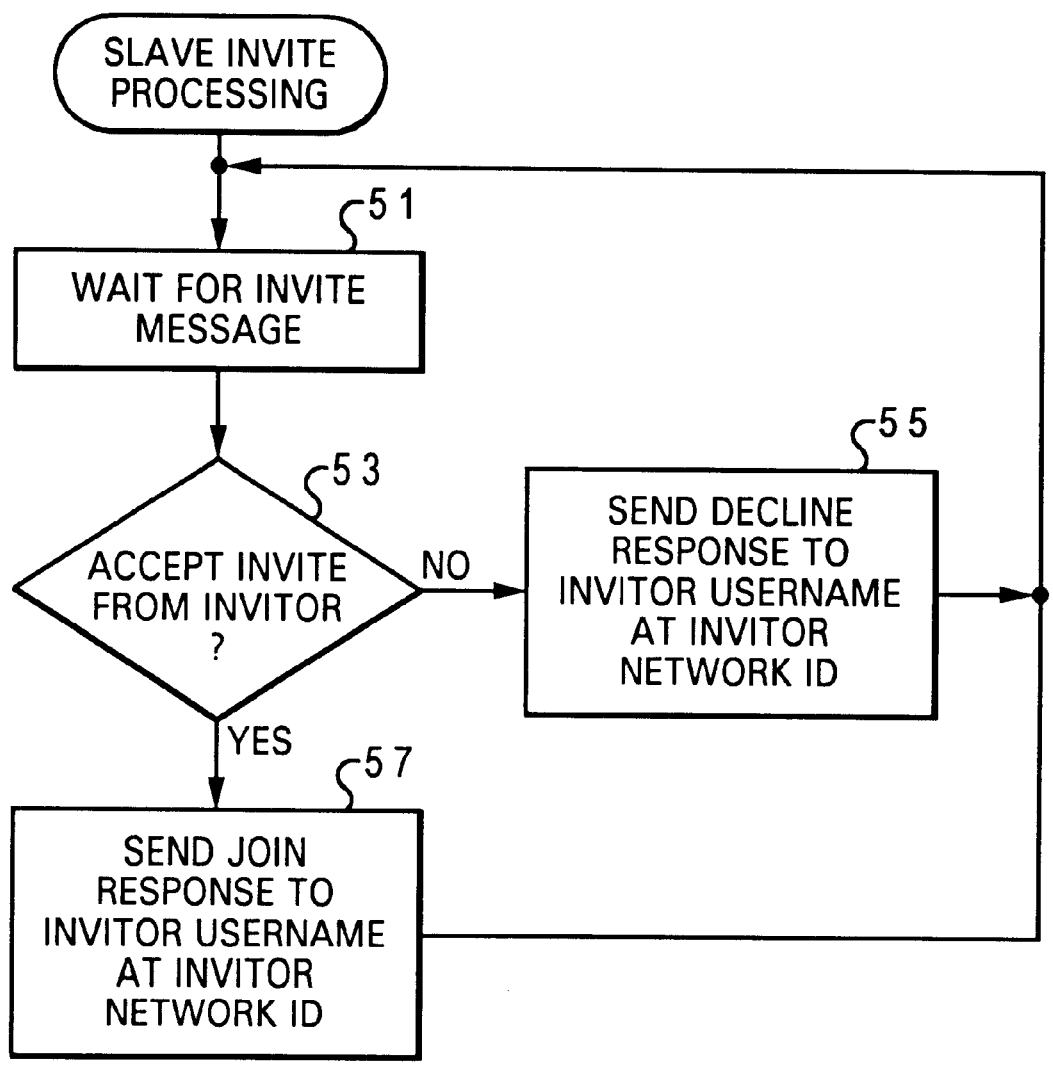
FIG. 4 is a flowchart of slave client invite processing according to the present invention.

Referring now to FIG. 4, there is shown a flowchart of slave chat client invite processing according to the present invention. The slave client waits for an invitation message from the chat server at block 51. When an invitation message is received, the slave chat client prompts the invitee user either to accept or decline the invitation. If, at decision block 53, the invitee user declines the invitation, the slave chat client sends a decline response to the invitor user name at the network address provided with the invite message, at block 55. If, at decision block 53, the invitee user accepts the invitation, the chat client sends a join response to the invitor user name at the invitor network ID, at block 57. Although chat session join and decline processing has been illustrated and described with respect to a slave chat client, it should be understood that a master client can participate in a chat session initiated by another master client.

Figure 5:
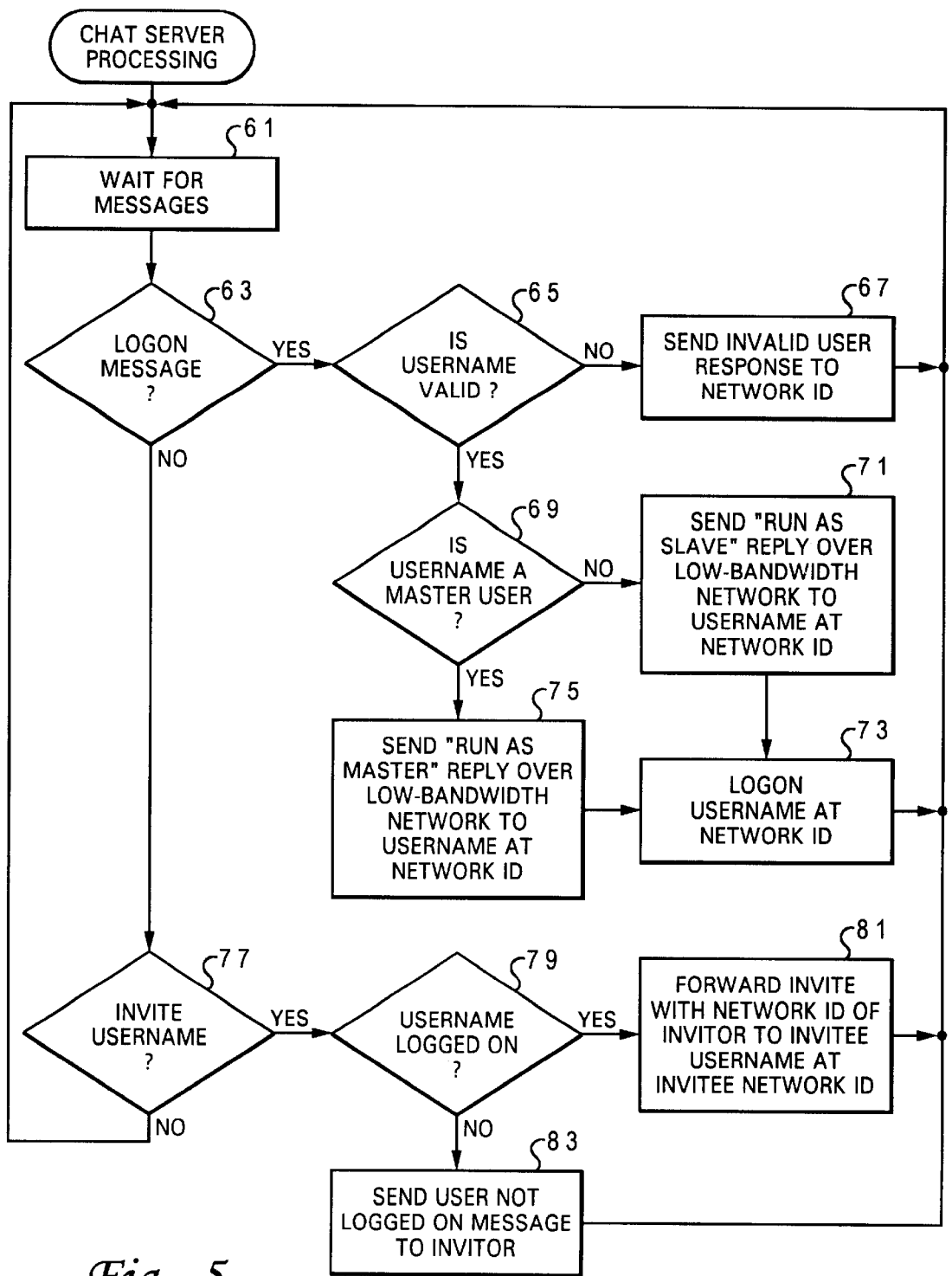
FIG. 5 is a flowchart of chat server processing according to the present invention.

Referring now to FIG. 5, there is shown a flowchart of chat server processing according to present invention. The chat server waits for messages, at block 61.

If, at decision block 65, the user name is valid, then the chat server determines, at decision block 69, if the user name identifies a master user. The chat server determines that the user name identifies a master user by consulting list of master users. If, at decision block 69, the user name identifies a master user, then the chat server sends a "run as master" reply over the low bandwidth network to the user name at the network address received with logon message, at block 71. Logging on a user includes the step of entering the logged on user name and network address in a logon table maintained by the chat server. Then, the chat server logs on the user name at the network ID, at block 73. If, decision block 69, the user name does not identify a master user, the chat server sends a "run as slave" reply over the low bandwidth network to the user name at the network ID, at block 75, and logs on the user name at the network ID, at block 73.

Referring still to FIG. 5, if, at decision block 77, the message received by the chat server is a proxy invitation to a user name, sent by a master chat client according to FIG. 3, the chat server determines, at decision block 79, if the user name is logged on. If so, the chat server forwards the invitation with the network ID of the invitor to the invitee user name at the invitee network ID listed in the logon table maintained by the chat server, at block 81. If, at decision block 79, the user name is not logged on, the chat server sends a "user not logged on" message to the invitor, at block 83.

From the foregoing, it may be seen that the method and system of present invention provide a distributed chat application that is well adapted for use in a bandwidth constrained network. The master/slave architecture provided by the present invention allows all users the ability to participate in the chat session, but it allows only a configurable number of users to initiate chat sessions. By the use of proxy invitation according to the present invention, chat clients are required only to have a list of users. Dynamic updating of network addresses is performed by the chat server.

What is claimed is:

1. A chat system, which comprises:
   a chat server;
   a chat client,
   said chat client being configurable in response to instructions from said chat server to operate in a master mode which is capable of initiating a chat session,
   said chat client being configurable in response to instructions from said chat server to operate in a slave mode which is capable of participating only in a chat session initiated by another chat client operating in said master mode.

2. The chat system as claimed in claim 1, wherein a user of said chat client has an identity, and said chat server includes means for is issuing configuration instructions to run in either said master mode or said slave to said chat client based upon the identity of said user.

3. The chat system as claimed in claim 3, wherein said means for issuing configuration instructions includes means for determining if said user is a master user.

4. The chat system as claimed in claim 3, wherein said means for determining if said user is a master user includes a list of master users.

5. The chat system as claimed in claim 3, wherein said chat client is identified by a network address, and said logon request includes said network address.

6. The chat system as claimed in claim 1, wherein said chat server includes means for issuing said configuration instructions in response to receipt of a logon request from said chat client.

7. The chat system as claimed in claim 6, wherein said chat server includes means for maintaining logon status for a user of said chat client.

8. The chat system as claimed in claim 1, wherein said chat client is configured in said master mode to send chat invitations to a proxy address for invitee users at said chat server.

9. The chat system as claimed in claim 8, wherein said chat server is configured to forward said chat invitations to said invitee users at network addresses for said invitee users.

10. A method of managing chat sessions in a network, which comprises the steps of:
    receiving at a chat server a logon request from a user of a chat client, said user being identified by a user name, and said chat client being identified by a network address;
    determining at said chat server if said user name identifies a master user or slave user; and,
    issuing configuration instructions according to the identity of said user name from said chat server to said chat client to run in a master mode wherein said user is capable of initiating a chat session; and alternatively
    issuing configuration instructions according to the identity of said user name from said chat server to said chat client to run in a slave mode wherein said user is capable of participating only in a chat session initiated by another chat client operating in said master mode.

11. The method as claimed in claim 10, wherein said step of determining if said user is a master user or a slave user includes the steps of determining if said user is listed in a list of master users maintained by said chat server.

12. The method as claimed in claim 10, including the step of:
    logging said user onto said network at said chat server.

13. The method as claimed in claim 10, wherein said step of logging said user onto said network includes the step of:
    entering the user name and network address of said user in a logon table.

14. The method as claimed in claim 10, including the steps of:
    receiving from an invitor user a chat invitation for an invitee user at said chat server; and,
    determining if said invitee user is logged onto said network.

15. The method as claimed in claim 14, including the step of:
    forwarding said chat invitation to said invitee user at the network address of said invitee user if said invitee user is logged onto said network.

16. The method as claimed in claim 15, wherein said step of forwarding said chat invitation to said invitee user includes the step of including the network address of said invitor user with said chat invitation.

17. The method as claimed in claim 15, including the step of prompting said invitee user to accept or decline said chat invitation.

18. The method as claimed in claim 17, including the step of informing said invitor user that said invitee user has declined said chat invitation.

19. The method as claimed in claim 18, wherein said step of informing said invitor user that said invitee user has declined said chat invitation includes the step of sending a message from said invitee user to said invitor user at the network address of said invitor user.

20. The method as claimed in claim 17, including the step of informing said invitor user that said invitee user has accepted said chat invitation.

21. The method as claimed in claim 20, wherein said step of informing said invitor user that said invitee user has accepted said chat invitation includes the step of sending a message from said invitee user to said invitor user at the network address of said invitor user.

22. The method as claimed in claim 14, including the step of:
    informing said invitor user that said invitee user is not logged onto said network if said invitee user is not logged onto said network.

23. The method as claimed in claim 22, wherein said step of informing said invitor user that said invitee is not logged onto said network includes the step of sending a message from said chat server to said invitor user at the network address of said invitor user.

* * * * *